(12) United States Patent
Woodral (10) Patent No.: US 7,231,480 B2
(45) Date of Patent: Jun. 12, 2007

(54) METHOD AND SYSTEM FOR RECEIVER DETECTION IN PCI-EXPRESS DEVICES

(75) Inventor: David E. Woodral, Walnut, CA (US)

(73) Assignee: QLogic, Corporation, Aliso Viejo, CA (US)

( * ) Notice: Subject to any disclaimer, the term of this patent is extended or adjusted under 35 U.S.C. 154(b) by 275 days.

(21) Appl. No.: 11/100,063

(22) Filed: Apr. 6, 2005

(65) Prior Publication Data

US 2006/0230211 A1    Oct. 12, 2006

(51) Int. Cl.
*G06F 13/00* (2006.01)
(52) U.S. Cl. .......................................... 710/302; 710/71
(58) Field of Classification Search ...................... None
See application file for complete search history.

(56) References Cited

U.S. PATENT DOCUMENTS

| | | | |
|---|---|---|---|
| 4,268,906 A | 5/1981 | Bourke et al. |
| 4,333,143 A | 6/1982 | Calder |
| 4,449,182 A | 5/1984 | Rubinson |
| 4,549,263 A | 10/1985 | Calder |
| 4,777,595 A | 10/1988 | Strecker et al. |
| 4,783,730 A | 11/1988 | Fischer |
| 4,783,739 A | 11/1988 | Calder |
| 4,803,622 A | 2/1989 | Bain, Jr. et al. |
| 5,129,064 A | 7/1992 | Fogg, Jr. et al. |
| 5,212,795 A | 5/1993 | Hendry |
| 5,249,279 A | 9/1993 | Schmenk et al. |
| 5,276,807 A | 1/1994 | Kodama et al. |
| 5,280,587 A | 1/1994 | Shimodaira et al. |
| 5,321,816 A | 6/1994 | Rogan et al. |
| 5,347,638 A | 9/1994 | Desai et al. |
| 5,371,861 A | 12/1994 | Keener et al. |
| 5,448,702 A | 9/1995 | Garcia, Jr. et al. |
| 5,568,614 A | 10/1996 | Mendelson |
| 5,613,162 A | 3/1997 | Kabenjian et al. |
| 5,647,057 A | 7/1997 | Roden et al. |
| 5,671,365 A | 9/1997 | Binford et al. |

(Continued)

FOREIGN PATENT DOCUMENTS

EP    0738978    10/1996

(Continued)

OTHER PUBLICATIONS

PCI Express Base Specification Revision 1.0, PCI-SIG, Apr. 29, 2002, pp. 183,184, and 199-201.*

(Continued)

*Primary Examiner*—Glenn A. Auve
(74) *Attorney, Agent, or Firm*—Klein, O'Neill & Singh, LLP (57) ABSTRACT

A method and system for detecting when a receiver in a host system is present or absent to receive information from a PCI-Express device is provided. The method includes monitoring a signal received from a serial/de-serializer for transitions; re-starting a first timer when a transition is detected; and detecting a receiver's absence if a second timer has reached a maximum value after a transition is detected and a first timer cycle is incomplete. The PCI-Express device includes a receiver detection logic that determines when a receiver is absent before sending any data to the host system. The PCI-Express device may be a host adapter.

13 Claims, 8 Drawing Sheets

U.S. PATENT DOCUMENTS

| | | |
|---|---|---|
| 5,740,467 A | 4/1998 | Chmielecki, Jr. et al. |
| 5,758,187 A | 5/1998 | Young |
| 5,761,427 A | 6/1998 | Shah et al. |
| 5,828,903 A | 10/1998 | Sethuram et al. |
| 5,875,343 A | 2/1999 | Binford et al. |
| 5,881,296 A | 3/1999 | Williams et al. |
| 5,892,969 A | 4/1999 | Young |
| 5,905,905 A | 5/1999 | Dailey et al. |
| 5,917,723 A | 6/1999 | Binford |
| 5,968,143 A | 10/1999 | Chisholm et al. |
| 5,983,292 A | 11/1999 | Nordstrom et al. |
| 6,006,340 A | 12/1999 | O'Connell |
| 6,049,802 A | 4/2000 | Waggener, Jr. et al. |
| 6,055,603 A | 4/2000 | Ofer et al. |
| 6,078,970 A | 6/2000 | Nordstrom et al. |
| 6,085,277 A | 7/2000 | Nordstrom et al. |
| 6,115,761 A | 9/2000 | Daniel et al. |
| 6,138,176 A | 10/2000 | McDonald et al. |
| 6,185,620 B1 | 2/2001 | Weber et al. |
| 6,233,244 B1 | 5/2001 | Runaldue et al. |
| 6,269,413 B1 | 7/2001 | Sherlock |
| 6,343,324 B1 | 1/2002 | Hubis et al. |
| 6,434,630 B1 | 8/2002 | Micalizzi, Jr. et al. |
| 6,457,090 B1 | 9/2002 | Young |
| 6,463,032 B1 | 10/2002 | Lau et al. |
| 6,502,189 B1 | 12/2002 | Westby |
| 6,504,846 B1 | 1/2003 | Yu et al. |
| 6,546,010 B1 | 4/2003 | Merchant et al. |
| 6,564,271 B2 | 5/2003 | Micalizzi, Jr. et al. |
| 6,721,799 B1 | 4/2004 | Slivkoff |
| 6,775,693 B1 | 8/2004 | Adams |
| 6,810,440 B2 | 10/2004 | Micalizzi, Jr. et al. |
| 6,810,442 B1 | 10/2004 | Lin et al. |
| 2003/0056000 A1 | 3/2003 | Mullendore et al. |
| 2003/0126320 A1 | 7/2003 | Liu et al. |
| 2003/0126322 A1 | 7/2003 | Micalizzi, Jr. et al. |
| 2003/0236953 A1 | 12/2003 | Grieff et al. |
| 2005/0093575 A1* | 5/2005 | Schoenborn et al. ......... 326/86 |
| 2005/0104623 A1* | 5/2005 | Guo et al. ................... 326/82 |
| 2006/0129733 A1* | 6/2006 | Sobelman ................. 710/305 |

FOREIGN PATENT DOCUMENTS

| | | |
|---|---|---|
| EP | 1059588 | 12/2000 |
| WO | WO 95/06286 | 3/1995 |
| WO | WO 00/58843 | 10/2000 |

OTHER PUBLICATIONS

PCI Express Base Specification Revision 1.0a; PCI-SIG; Apr. 15, 2003; pp. 171,172,204, and 205.*

* cited by examiner

METHOD AND SYSTEM FOR RECEIVER DETECTION IN PCI-EXPRESS DEVICES

BACKGROUND

1. Field of the Invention

The present invention relates to PCI-Express devices and more particularly, to detecting that a receiver is connected and available.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation®, or the extension of PCI known as PCI-X. More recently, PCI-Express, a standard interface incorporating PCI transaction protocols at the logical level, but using serial data transfer at the physical level has been developed to offer better performance than PCI or PCI-X.

PCI-Express is an Input/Output ("I/O") bus standard (incorporated herein by reference in its entirety) that is compatible with existing PCI cards using the PCI Express bus. PCI-Express uses discrete logical layers to process inbound and outbound information. In the PCI-Express terminology, a serial connection between two devices is referred to as a link.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters, for example, host bus adapters ("HBAs").

HBAs (a PCI-Express device) that are placed in SANs receive serial data streams (bit stream), align the serial data and then convert it into parallel data for processing, as described above. HBAs operate as a transmitting device as well as the receiving device.

PCI-Express devices (for example, HBAs' in SANs) receive serial data, align the serial data and then convert the serial data into parallel data. PCI-Express devices use PCI-Express core logic for interfacing with host systems. The PCI-Express core logic includes a control status module ("PCS module") that has a serial/de-serializer ("SERDES"), besides other components. The SERDES in the PCS communicates with a SERDES in a host system. Before the SERDES in the PCS module can communicate with a SERDES in the host system, the PCS module detects if a receiver (i.e. the SERDES in the host system) is present and/or available to receive data.

In conventional systems, a SERDES vendor provides the mechanism to detect if a receiver is present. Often, the mechanism provided indicates that a receiver is present by using specific receiver detection protocol incorporating a set frequency, for example, 3 to 15 kilohertz if a receiver is present or above 30 kilohertz is a receiver is not present. Such proprietary conventional techniques have shortcomings. For example, detecting a receiver at a frequency of 3 kilohertz may cause delay and may take too long. Therefore, there is a need for a method and system to perform the receiver detection efficiently.

SUMMARY OF THE INVENTION

In one aspect of the present invention, a method for detecting when a receiver in a host system is present or absent to receive information from a PCI-Express device is provided. The method includes, monitoring a signal received from a serial/de-serializer for transitions; re-starting a first timer when a transition is detected; and detecting a receiver's absence if a second timer has reached a maximum value after a transition is detected and a first timer cycle is incomplete.

A first timer output value is compared to a programmed value and if the first timer output value is equal to the programmed value then a receiver is presumed to be present. If a transition is not detected then an edge detector continues to monitor the signal received from the serial/de-serializer.

A second timer output value is compared to a programmed value and when the second timer output value is not equal to the programmed value, a signal is produced to declare a receiver's absence. If the second timer output value is equal to the programmed value, then a receiver is presumed to be present.

In another aspect of the present invention, a PCI-Express device is provided. The PCI-Express device includes receiver detection logic that determines when a receiver is absent before sending any data to a host system. An edge detector module in the receiver detection logic monitors a signal received from a SERDES for any transitions.

If a transition is detected, a first timer is re-started. A second timer is used to declare that a receiver is absent when the first timer's cycle is incomplete after a certain time interval.

An output control module receives an input based on a comparison of a second timer value and a programmed value and declares that a receiver is absent. If an output from the first timer is equal to a programmed value, then a receiver is presumed to be present.

A system for connecting host systems with storage devices is provided. The system includes a PCI-Express device with a receiver detection logic that determines when a receiver is absent before sending any data to a host system.

The PCI-Express device in the foregoing aspects includes a HBA.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, receiver detection is accomplished using a special block within a SERDES that drives the serial interface to a common mode voltage, then changes that differential voltage and measures the rate of change on the interface signals. The rate of change is converted to a frequency on a specialized signal the rate of which varies depending on whether or not a receiver is attached.

To facilitate an understanding of the preferred embodiment, the general architecture and operation of a host/HBA/PCI-Express topology will be described. The specific architecture and operation of the preferred embodiment will then be described with reference to the general architecture.

Figure 1A:
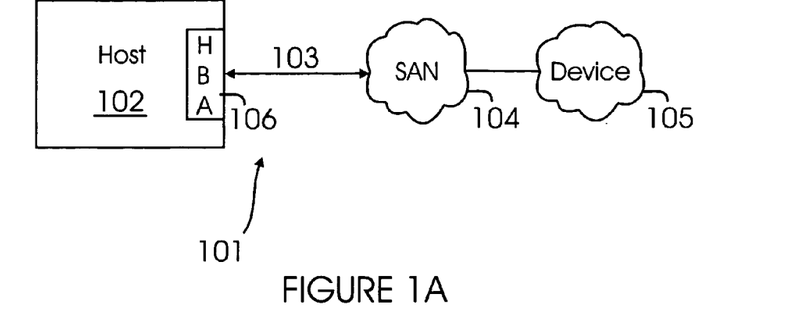
FIG. 1A shows a block diagram of a host system communicating with a device.

Host System/HBA:

FIG. 1A shows a block diagram of a system 101 where a host computing system 102 is coupled to a storage device 105 via a SAN 104. HBA 106 facilitates data transfer between host 102 and device 105.

Figure 1B:
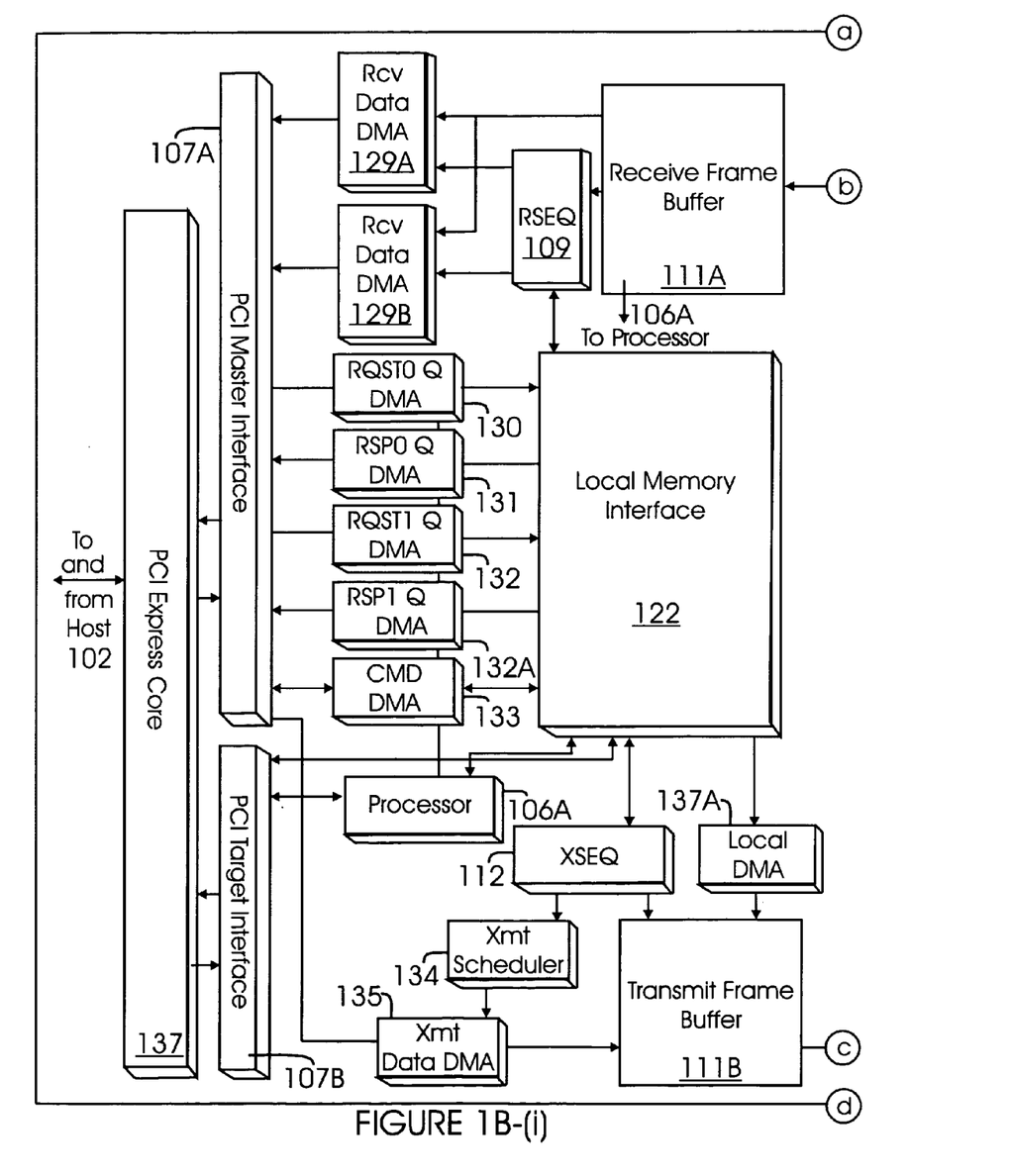
FIG. 1B shows a block diagram of a HBA, used according to one aspect of the present invention.

FIG. 1B shows a block diagram of HBA 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from a host memory (not shown) to the storage systems via adapter 106. Receive path means data path from storage subsystem via adapter 106. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory (not shown) and local memory interface 122. Memory interface 122 is provided for managing local memory. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI master interface 107A and PCI target interface 107B are both coupled to PCI Express Core logic 137 (may also be referred to as "logic 137" or "module 137"). Interface 107A and 107B includes an arbitration module that processes DMA access to plural DMA channels.

Figure 1C:
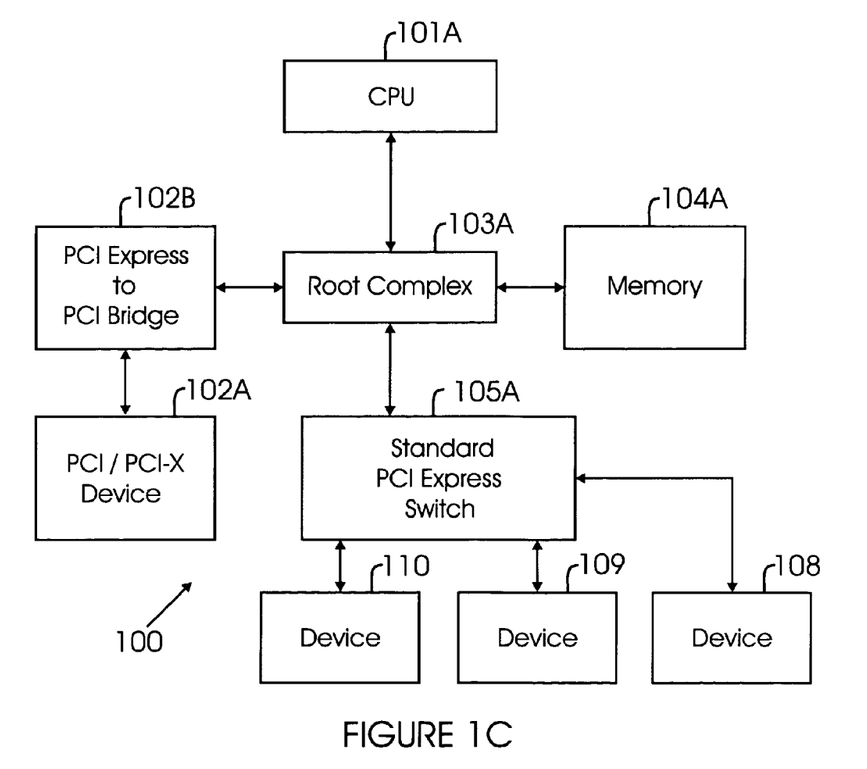
FIG. 1C shows a block diagram of a PCI-Express standard fabric topology.

PCI-Express Overview:

FIG. 1C shows a block diagram of a PCI-Express standard fabric topology 100. A central processing unit ("CPU") 101A (part of a computing or host system) is coupled to a "root complex" 103A. Root complex 103A as defined by the PCI-Express standard is an entity that includes a Host Bridge and one or more Root Ports. The Host Bridge connects a CPU to a Hierarchy; wherein a Hierarchy is the tree structure of a PCI-Express topology.

Root complex 103A is coupled to a PCI-Express/PCI bridge 102B that allows CPU 101A to access a PCI (or PCI-X) device 102A. Memory 104A is also coupled to root complex 103A and is accessible to CPU 101A.

Root complex 103A is also coupled to a standard PCI-Express switch (may be referred to as "switch") 105A that is coupled to devices 108-110. CPU 101A can communicate with any of the devices 108-110 via switch 105A.

Figure 1D:
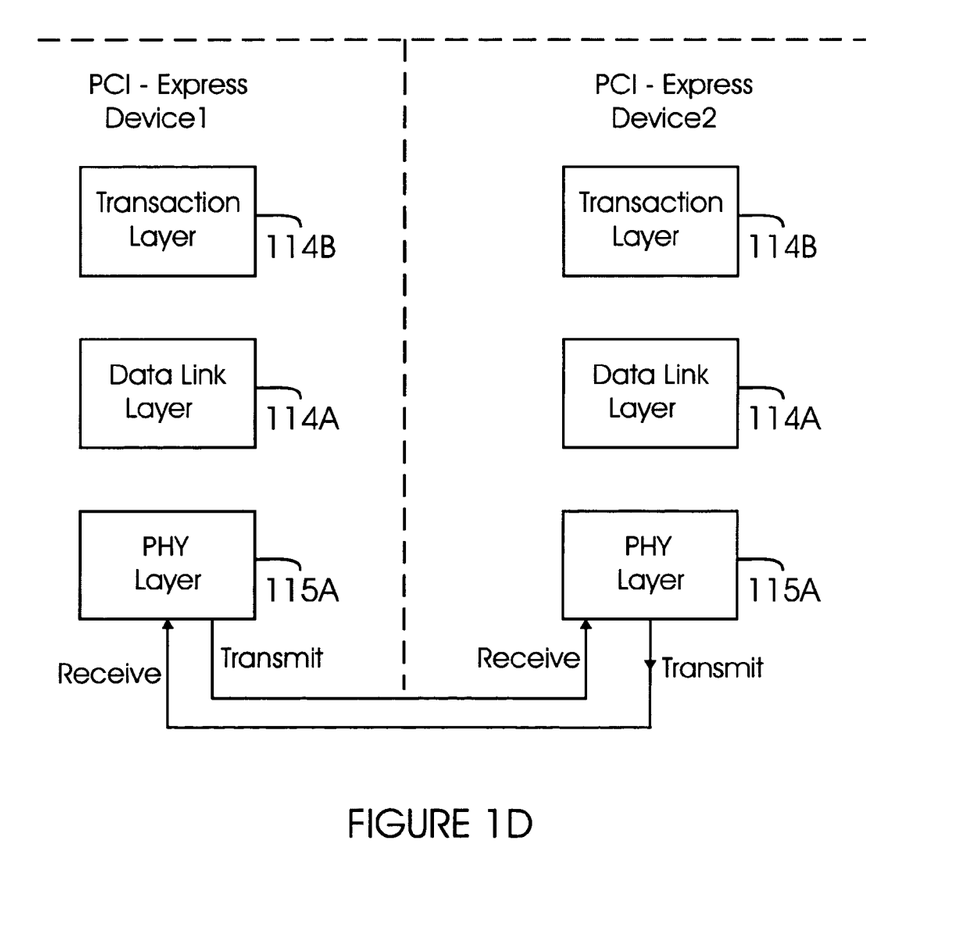
FIG. 1D shows the layered architecture of PCI-Express standard.

PCI-Express uses discrete logical layers to process inbound and outbound information. The logical layers are the Transaction Layer 114B, Data Link Layer ("DLL") 114A and a Physical Layer ("PHY") 115A, as shown in FIG. 1D. A receive side communicates with a transmit side.

PCI-Express uses a packet-based protocol to exchange information between Transaction layers 114B. Transactions are carried out using Requests and Completions. Completions are used only when required, for example, to return read data or to acknowledge completion of an I/O operation.

At the transmit side, packets flow from the Transaction Layer 114B to PHY 115A. On the receive side, packets are processed by the PHY layer 115A and sent to the Transaction layer 114B for processing. DLL 114A serves as an intermediate layer between PHY layer 115A and Transaction layer 114B.

The Transaction Layer 114B assembles and disassembles Transaction Layer Packets ("TLPs"). TLPs are used to communicate transactions, such as read and write and other type of events.

Figure 2A:
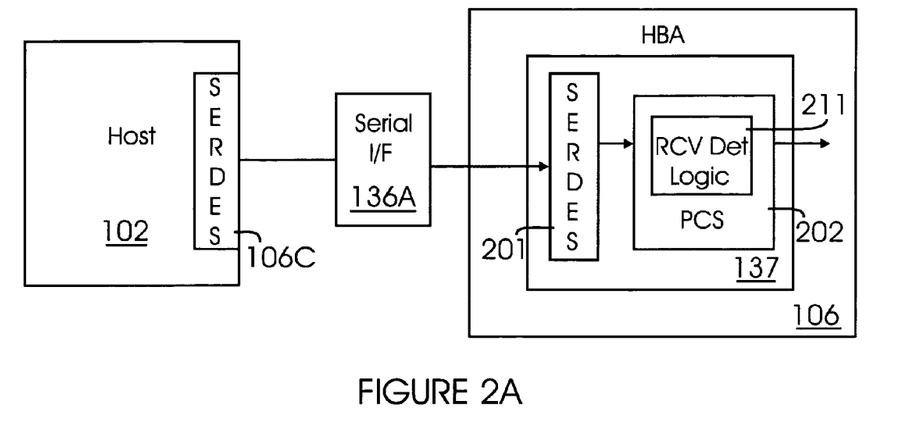
FIG. 2A shows a block diagram of a HBA with a PCS module, used according to one aspect of the present invention.

Receive Detection Logic:

FIG. 2A shows a system level block diagram with an expanded view to show certain components of logic 137. Logic 137 includes SERDES 201 and PCS module 202 that are described below in detail. PCS module 202 includes a receiver detection logic 211 (may also be referred to as module 211 or logic 211) described below in detail.

Host 102 sends random serial data via SERDES 106C and serial interface 136A. SERDES 201 receives the incoming data stream and passes the data stream to PCS 202.

Figure 2B:
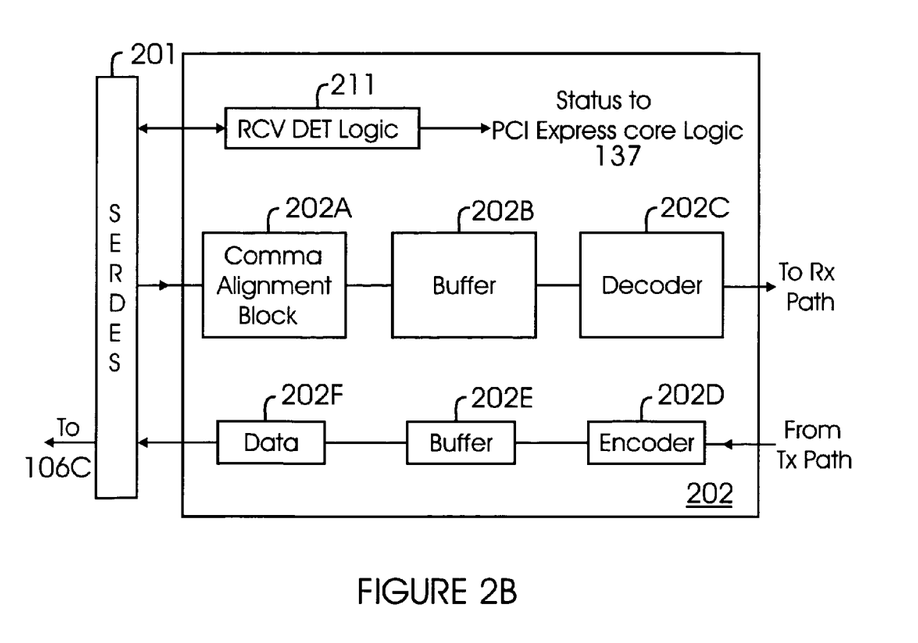
FIG. 2B shows a block diagram of a PCS module, according to one aspect of the present invention.

FIG. 2B shows a block diagram of PCS 202 with a comma alignment block 202A, a buffer 202B and a decoder 202C in the receive path (i.e. data coming from host 102). Comma alignment block 202A uses a comma character to determine where data boundary begins (or ends). The incoming bits from SERDES 201 are synchronized with respect to the comma character.

In the transmit path (i.e. data from SERDES 201 to SERDES 106C), an encoder 202D encodes data received from the transmit path, a buffer 202E stages the data and then data 202F is sent to SERDES 201. Before data is sent from SERDES 201 to 106C, logic 211 detects if a receiver is not present, in contrast with convention systems that detect if a receiver is present, and reports the results to the PCI Express® Core 137. This information informs the logic in the PCI Express Core 137 about the number of traffic lanes available for data transmission.

It is noteworthy that the transmit and receive paths shown in FIG. 2B are opposite of the transmit and receive paths discussed above with respect to FIG. 1B.

Figure 2C:
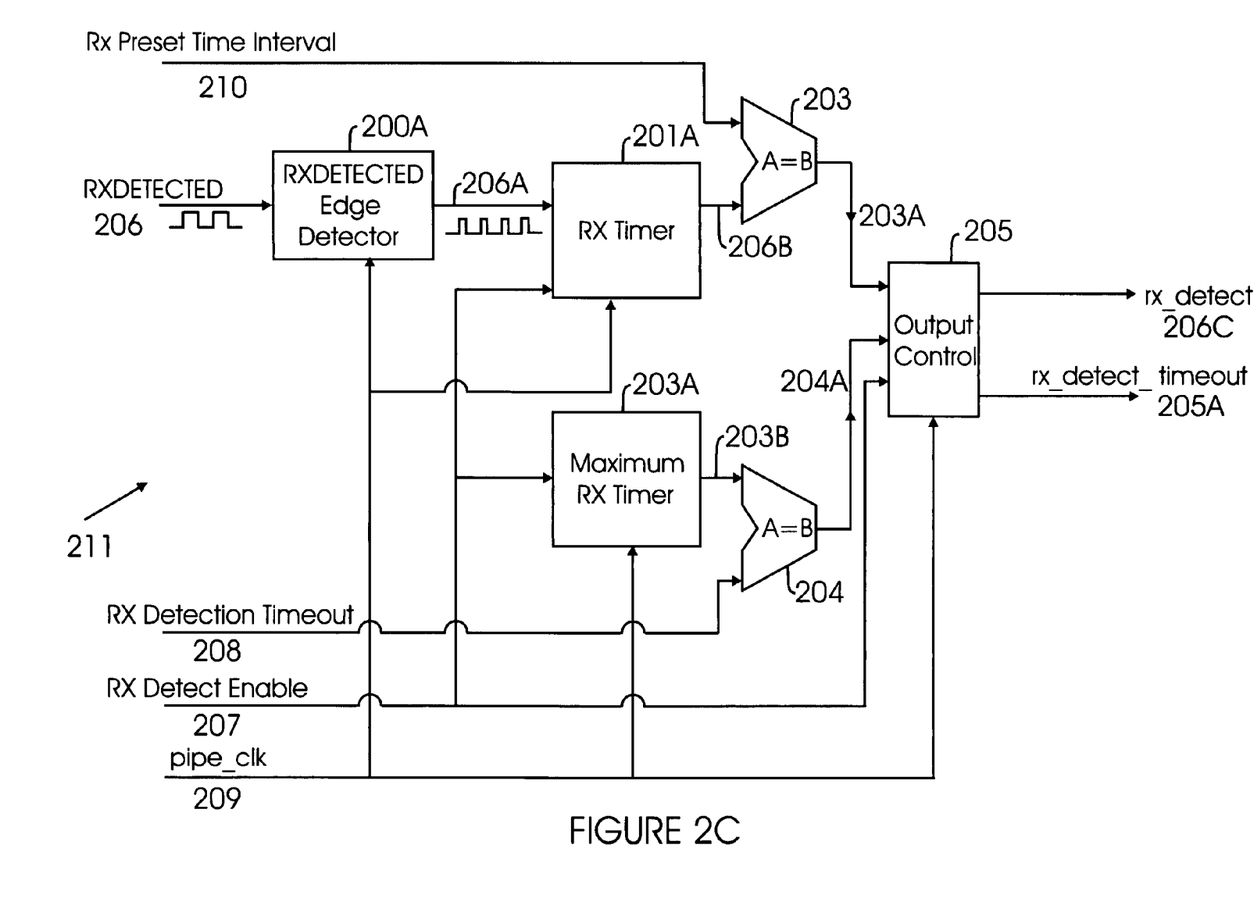
FIG. 2C shows a diagram of receiver detection logic, according to one aspect of the present invention.

FIG. 2C shows a block diagram of logic 211, according to one aspect of the present invention. Logic 211 measures the signal RXDETECTED period to determine if a receiver is not present and if the test fails, then the receiver is presumed to be present.

RXDETECTED signal 206 (may also be referred to as "signal 206" and may be a proprietary signal generated from SERDES 201) is received from SERDES 201 by an edge detector module 200A (referred to herein as "module 200A"). Module 200A then monitors signal 206, 15 synchronizing it to a system clock (shown as pipe_clk 209) and then generates an output pulse 206A for every transition in signal 206.

Programmable timers/counters 201A (shown as RX Timer) and 203A (shown as Maximum RX Timer) are used to determine the presence of a receiver. Timer 201A is initially set to zero or any other pre-determined value and it increments when enabled using signal 207. The receiver detection function is enabled whenever the PCI the Express Core 137 needs to determine if a receiver is present. Receiver detection is typically performed immediately after power is applied or following a system reset, but may also be initiated as part of an error recovery sequence.

Output from timer 201A (shown as 206B) is compared to a programmable value 210 that is provided to PCS 202. A receiver is declared to be present if programmed value 210 is equal to 206A.

If a transition is detected by module 200A, then timer 201A is re-initialized and the measuring cycle restarts. Timer 203A determines the maximum length of time during which the RX detection measurement cycle runs before declaring that a receiver is not available (or present). If timer 203A reaches a certain value (for example, a maximum value) based on the programmed value 208, and timer 201A has not completed its cycle, then the receiver is declared to be "not" present.

Logic 211 includes two comparators, 203 and 204. Comparator 203 generates signal 203A when 206B and 210 are equal. This generates signal 206C, which means that a receiver is present.

Comparator 204 compares output from timer 203A (shown as 203B) and programmable value 208. Based on signal 204A, output control module 205 generates a receiver "not" present signal 205A.

Figure 2D:
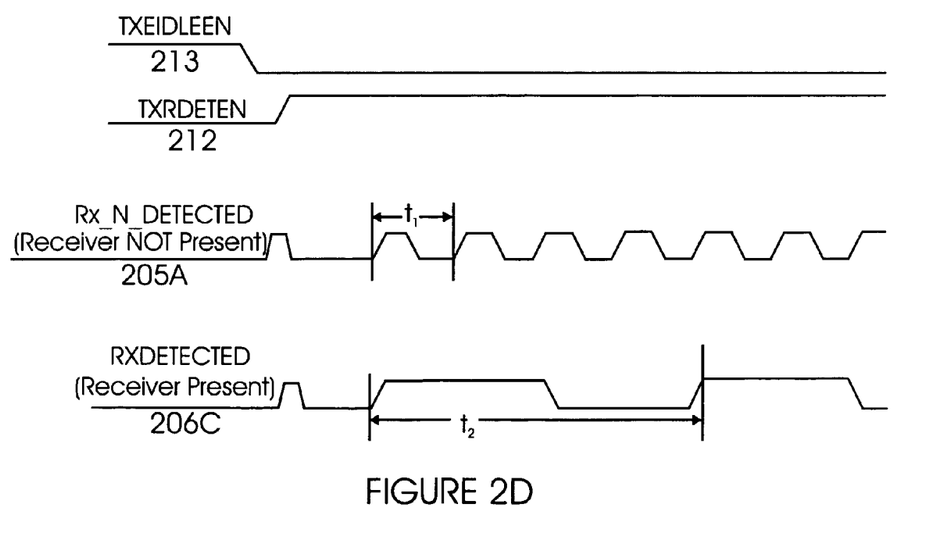
FIG. 2D shows a timing diagram for the receiver detection logic, according to one aspect of the present invention.

FIG. 2D shows a timing diagram of various signals, according to one aspect of the present invention. TXEIDLEEN 213 (referred to as "Signal 213") is used to start the detection sequence by logic 111. When set to 0, signal 213 initiates an idle state and then TXREDETEN 212 ("signal 212") is asserted high. While signal 212 is asserted high, the receiver detection process starts and the Serial Interface Device provides the appropriate frequency, 205A or 206A, on signal RXDETECTED (206) based upon the receiver discovery process. A high frequency is generated if there is not a receiver present, 205A, or a low frequency is generated if a receiver is present, 206C.

If frequency of signal 206C was used, the system will take time "t2" to determine that a receiver is present or not. Based on signal 205C (i.e. when a receiver is not present), t1 is the time it takes to detect when a receiver is not present.

As shown in FIG. 2D, t1 is less than t2 and hence it is faster to detect when a receiver is not present, according to one aspect of the present invention.

Figure 1E:
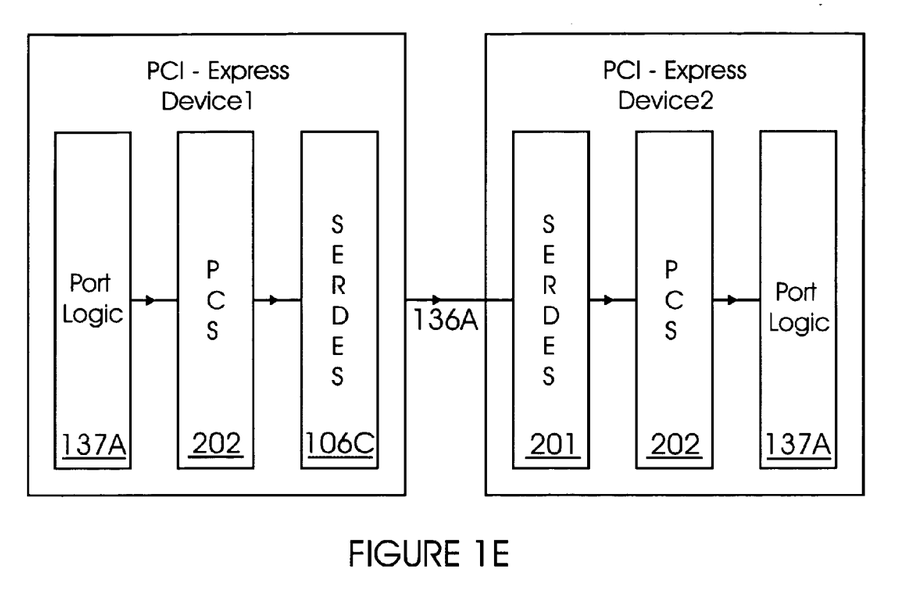
FIG. 1E shows two PCI-Express devices communicating.

Although the foregoing example is given with respect to a HBA, the present invention is applicable to any PCI-Express device. The general architecture with respect to PCI-Express devices is shown in FIG. 1E, where PCI-Express device 1 communicates with PCI-Express device 2 using the serial interface 136A. In this configuration, SERDES 106C transmits a serial bit-stream to SERDES 201. The port logic 137A in PCI-Express device 2 receives the de-coded data from PCS 202.

Figure 3:
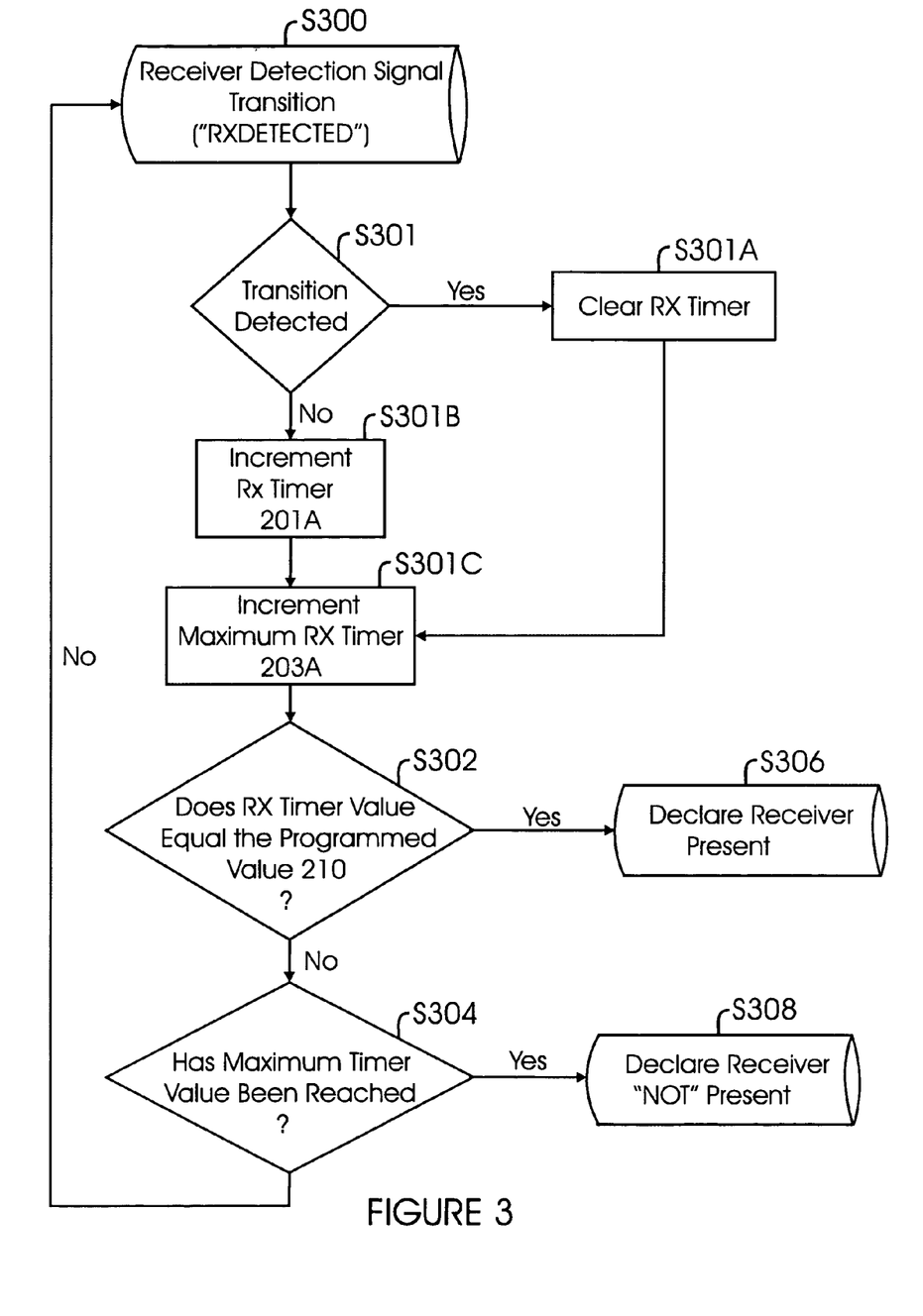
FIG. 3 is a flow diagram of process steps for receiver detection, according to one aspect of the present invention.

Process Flow:

FIG. 3 shows a process flow diagram for detecting when a receiver is not present, according to one aspect of the present invention. The following discussion assumes the PCI Express core 137 has enabled the receiver detection process, and the RX Timer 201A and Maximum RX Timer (203A) are both initialized to a predetermined starting value. In this embodiment the predetermined starting value may be zero, while in other implementations the values may be different.

The preprogrammed value 210 is equal to the longest period expected to be generated on signal 206 if a receiver is not present. The preprogrammed value 208 for the Maximum RX Timer 203A is set equal to, or slightly greater than (210) allowing for slight system variations.

When the PCI Express Core (137) enables the Receiver Detection Process, the RX Timer (201A) and Maximum RX Timer (203A) advance on every clock transition of the system clock (209). In this example the timers (201A and 203A are allowed to advance by one, however, other implementation may be different.

Turning in detail to FIG. 3, in step S300, module 200A continuously monitors the RXDETECTED input (206) for the presence of transitions and if a transition is detected in step S301, edge detector 206 generates an output pulse 206A. At decision point S301, if a transition is detected, the RX timer (201A) is cleared in step S301A and the process moves to step S301C. If a transition is not detected, then timer 201A is increased (or "incremented"). Thereafter, the Maximum RX Timer (203A) is incremented in step S301C regardless of any transitions detected on signal 206.

In step S302, the RX timer 201A contents are compared to preprogrammed value 210 to determine if the RX detection period is reached. If the values are equal, then in step S306, the receiver is declared to be present and reported to the PCI Express Core 137.

If in step S302, if it is determined that the receiver detection period has not elapsed, then in step S304, the Maximum Timer 203A value is compared to the preprogrammed value 208 to determine if Maximum timer 203A has reached it's maximum preprogrammed value.

If the decision logic in step S304 determines that the Maximum Timer has reached it's maximum value, then in step S308 "a receiver is not present" is declared to the PCI Express Core 137. If the Maximum RX Timer 203A has not reached the maximum preprogrammed value then the process reverts back to step S300 until a decision point is reached and a receiver is declared either to be present or not present.

Since the preprogrammed value for receiver not present (208) is considerably less than the receiver present value (210), less time is required to determine if a receiver is not present, or the inverse, that is a receiver is present.

Although the present invention has been described with reference to specific embodiments, these embodiments are illustrative only and not limiting. Many other applications and embodiments of the present invention will be apparent in light of this disclosure and the following claims.

What is claimed is:

1. A method for detecting when a receiver in a PCI-Express device is present or absent to receive information, comprising:
   monitoring a signal received from a serial/de-serializer for transitions;
   re-starting a first timer when a transition is detected; and
   detecting a receiver's absence if a second timer has reached a maximum value after a transition is detected and a first timer cycle is incomplete.

2. The method of claim 1, wherein a first timer output value is compared to a programmed value and if the first timer output value is equal to the programmed value then a receiver is presumed to be present.

3. The method of claim 1, wherein a second timer output value is compared to a programmed value and when the second timer output value is not equal to the programmed value, a signal is produced to declare a receiver's absence.

4. The method of claim 3, wherein if the second timer output value is equal to the programmed value, then a receiver is presumed to be present.

5. The method of claim 1, wherein if a transition is not detected then an edge detector continues to monitor the signal received from the serial/de-serializer.

6. The method of claim 1, wherein if a transition is not detected, then a receiver is presumed to be present.

7. The method of claim 1, wherein an output control module generates a signal to declare if a receiver is present or absent.

8. The method of claim 1, wherein the PCI-Express device is a host bus adapter.

9. A PCI-Express device, comprising:
   receiver detection logic that determines when a receiver is absent before sending any data to another PCI-Express device;
   wherein an edge detector module monitors a signal received from a serial de-serializer for any transitions; and
   if a transition is detected, a first timer is re-started; and
   a second timer is used to declare that a receiver is absent when the first timer's cycle is incomplete after a certain time interval.

10. The PCI-Express device of claim 9, wherein the time interval is programmable.

11. The PCI-Express device of claim 9, wherein an output control module receives an input based on a comparison of a second timer value and a programmed value and declares that a receiver is absent when the second timer value is equal to the programmed value.

12. A system for connecting host systems with storage devices comprising:
   a PCI-Express device with a receiver detection logic that determines when a receiver is absent before sending any data to a host system;
   wherein an edge detector module monitors a signal received from a serial de-serializer for any transitions; and
   if a transition is detected, a first timer is re-started; and
   a second timer is used to declare that a receiver is absent when the first timer's cycle is incomplete after a certain time interval.

13. The system of claim 12, wherein the time interval is programmable.

* * * * *

UNITED STATES PATENT AND TRADEMARK OFFICE
CERTIFICATE OF CORRECTION

| | | |
|---|---|---|
| PATENT NO. | : 7,231,480 B2 | Page 1 of 1 |
| APPLICATION NO. | : 11/100063 | |
| DATED | : June 12, 2007 | |
| INVENTOR(S) | : David E. Woodral | |

It is certified that error appears in the above-identified patent and that said Letters Patent is hereby corrected as shown below:

In column 5, line 44, after "206," delete "15".

Signed and Sealed this

Fourth Day of May, 2010

David J. Kappos
*Director of the United States Patent and Trademark Office*